(No Model.)　　　　　　　　　　　　　　2 Sheets—Sheet 1.
A. G. COOKE.
VARIABLE AND REVERSING SPEED GEAR.
No. 594,195.　　　　　　　　　Patented Nov. 23, 1897.
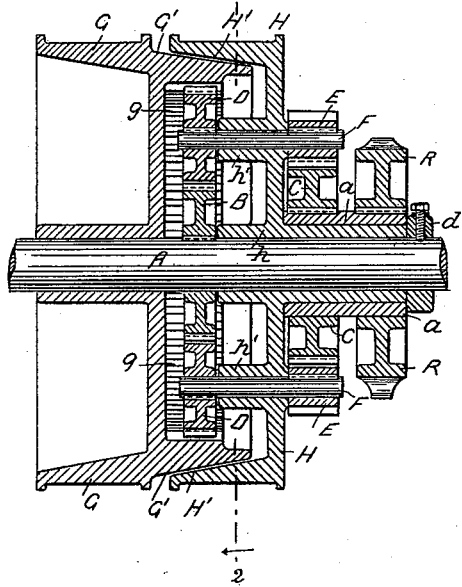
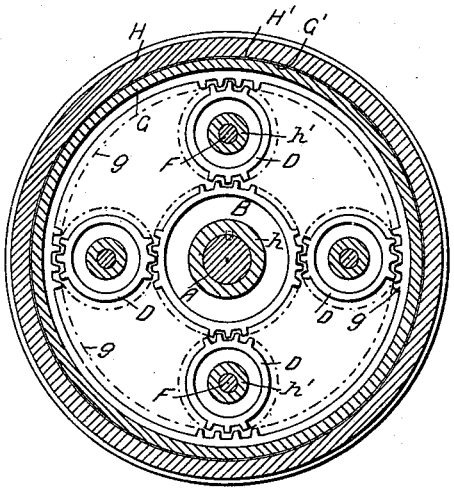
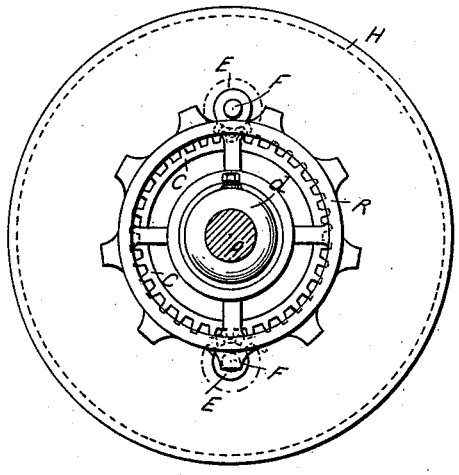
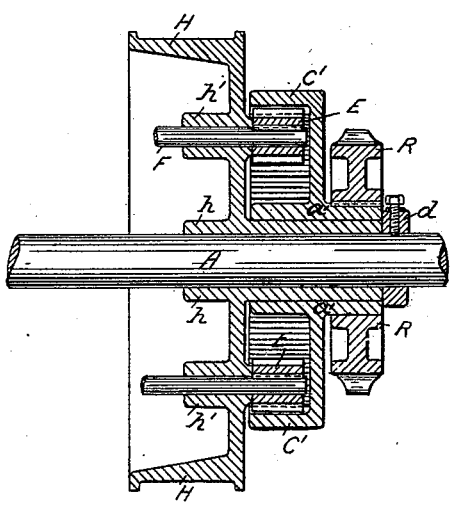
WITNESSES:　　　　　　　　　　　　　　INVENTOR:
Fred White　　　　　　　　　　　　Arthur George Cooke,
Thomas F. Wallace　　　　　　　　　By his Attorneys:

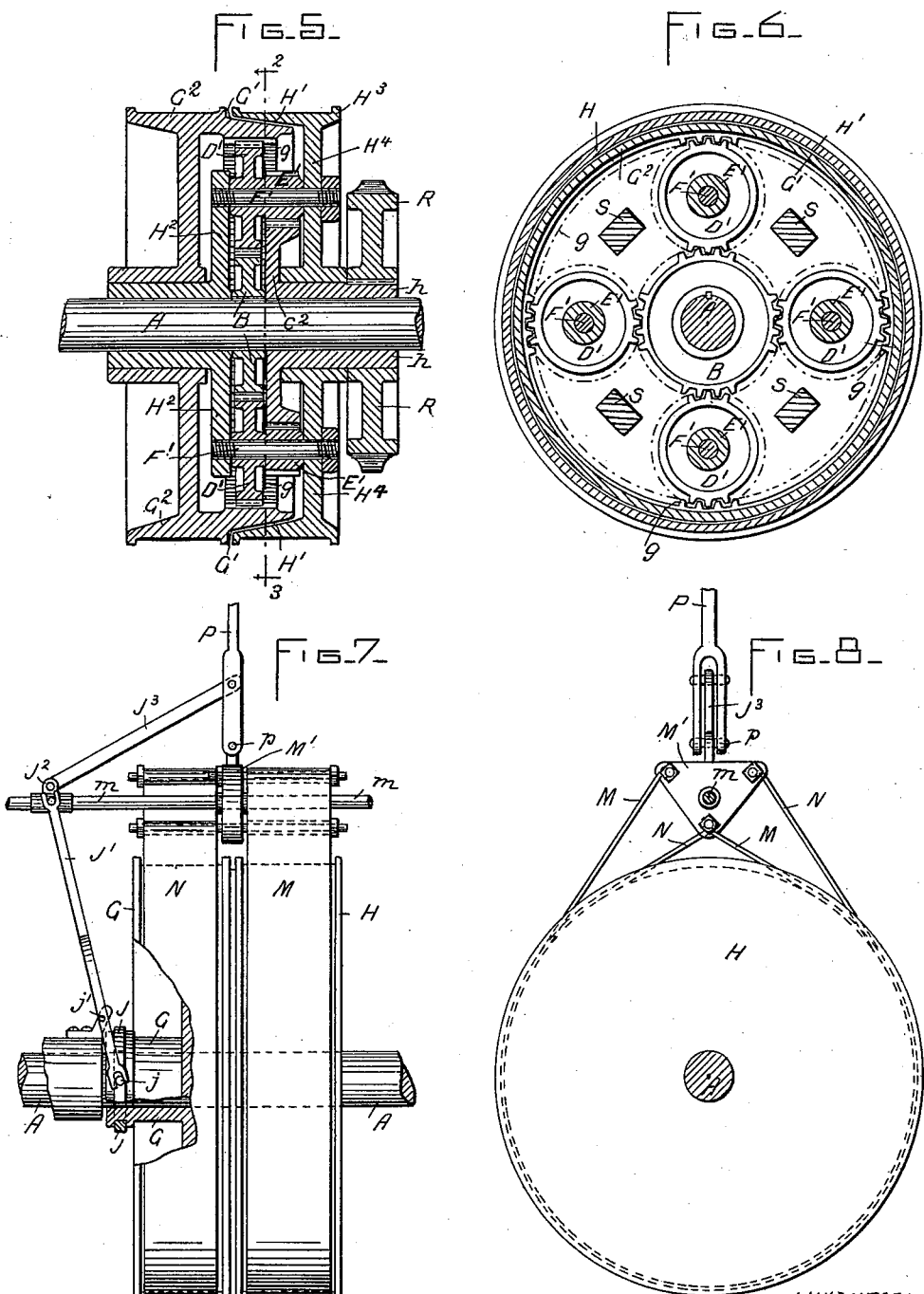

UNITED STATES PATENT OFFICE.

ARTHUR G. COOKE, OF LONDON, ENGLAND.

VARIABLE AND REVERSING SPEED GEAR.

SPECIFICATION forming part of Letters Patent No. 594,195, dated November 23, 1897.

Application filed July 9, 1897. Serial No. 644,004. (No model.)

*To all whom it may concern:*

Be it known that I, ARTHUR GEORGE COOKE, a subject of the Queen of Great Britain and Ireland, and a resident of 60 Coolhurst Road, Crouch End, London, England, have invented certain new and useful Improvements in Variable and Reversible Speed Gears, of which the following is a specification.

My invention relates to variable and reversible speed gears by means of which the motion of a driver, such as an engine or electric motor, is communicated to a follower or machinery to be driven.

The present invention has for one of its objects to provide a simple, efficient, and easily-worked multiple-speed gear in which the speed ratio is capable of variation at will or automatically without stopping the machinery or causing heavy shock or strain during the variation.

A further object of the invention is to provide means whereby the direction of motion of the follower or driven machinery or axle can be reversed while the driver moves uniformly in the same direction.

The invention also relates to certain details of construction which are fully described, and pointed out in the claims.

By my invention I obtain a gear which is at the same time efficient, strong, and light, and therefore especially adapted to cycles, motor-cars, and the like; but with suitably-modified constructional details it is also applicable to cranes, lathes, lifts, and in fact to any machinery in which the speed ratio of driver to follower is required to be frequently changed or the direction of motion reversed.

According to my invention the motion of the driving-wheel is transmitted to the following wheel through a combination or a plurality of combinations comprising two or more pinions in each, rotating together upon the same axle, the teeth of said driver and follower meshing with those of the same pinion or of different pinions of each combination used, the axles of these combinations of pinions being mounted on another or "differential" wheel, in order to allow of a further motion in addition to the rotary motion of the combinations of pinions.

For obtaining various speed ratios and a reversal of motion, when required, I employ brakes holding either the differential wheel or some other independent wheel upon which one of the pinions of each combination then rolls as an epicyclic or hypocyclic wheel, and I obtain a further speed ratio (of unity) by means of a clutch between any two elements of the gear whereby it is caused to rotate as a solid mass. I can also use the differential wheel as either driver or follower, and I may vary the details of my invention to obtain three or more speed ratios in the same direction or two speed ratios in one direction and one in the reverse direction, as hereinafter shown.

I am aware that two separate alternative differential gears giving different speed ratios and utilized at different times by a brake acting on an otherwise idle element of either of them is not new; also, that a differential gearing with pairs of epicyclic pinions instead of single pinions has been constructed, and I lay no claim to such gears; but what I aim to claim as of my invention is the novel combination and combinations of the several parts wherein more than two wheels gear with such pairs of pinions, as will be hereinafter fully set forth, and defined in the claims.

Referring now to the accompanying drawings, in which similar letters of reference indicate corresponding parts in all the figures, Figure 1 is a central section through my improved variable-speed gear. Fig. 2 is a section on line 1 2 thereof, looking to the left. Fig. 3 is a right-hand end elevation. Fig. 4 is a section through part of an alternative design. Fig. 5 is a central section of a slightly-modified form of my improved three-speed gear; and Fig. 6 is a section on line 2 3 thereof, showing strengthening-stays. Fig. 7 is a part sectional side elevation showing brake and clutch operating devices, and Fig. 8 a front elevation of same.

A is a high-speed motor-shaft, and B a pinion keyed fast thereto.

H is a differential or supporting wheel which is shown with a coned interior surface H' for a three-speed gear hereinafter described, having a long sleeve or bearing $h$ rotating upon the shaft A. Upon the sleeve $h$ is fitted a rotary sleeve $a$, to which sleeve is keyed the follower C and the chain-wheel R or equivalent from which the power is transmitted to the machinery to be driven in the usual way. *d* is an end stop for securing the whole in position.

Power is transmitted from the driver B to the follower C through two intermediate pinions D and E, keyed to a common axle F, mounted in a long bearing *h'* upon the said differential wheel H. The pairs of pinions D E are duplicated or triplicated or quadruplicated in symmetrical position around the shaft A, and the differential wheel H is controllable by a band-brake, such as M, Figs. 7 and 8. When the brake is applied, the action is similar to that known as the "back gear" for speed reduction in an ordinary lathe, giving, as shown, a speed ratio of reduction.

G is another large wheel of the form shown, with a coned surface at G' for three speeds, hereinafter explained, and rotating on the motor-shaft A, and it is also provided with a band-brake N, Figs. 7 and 8, and has internal teeth *g*, as shown, meshing with those of the pinion D and its fellows. When the brake is applied to wheel G, (instead of H, as above described,) the pinions D D roll upon the internal teeth as hypocyclic wheels. The wheel H will then rotate slowly, giving a second speed ratio of less reduction than the above case. In order to add another speed ratio, I mount the wheel G, which may be called the "controlling-wheel," so as to be capable of longitudinal motion upon the shaft A by means of a shifter, such as is shown in Fig. 7, and I employ the coacting coned surfaces G' H', above referred to. The means for traversing the wheel H may consist of a collar J upon the wheel G, operated through a pin and fork *j* by levers J', centered at *j'* and actuated through the system of levers J' J² J³ by the main lever P, or any other convenient mechanical means may be substituted. When full speed is required, both the band-brakes M N are released and a traversing motion is given to the wheel G through the device described, which brings it into contact with wheel H through the cone-clutch G' H', as shown, Fig. 1. Then the pinions D E can no longer rotate about their common axle F, and the whole gear is rotated as a rigid mass.

The above-described gears give motion in one direction only; and my invention further consists in an arrangement for obtaining a reversal of motion in addition to two speed ratios direct. This is shown in Fig. 4, and consists in the combination, with the pinions D and E, of a large follower C', similar to G, with internal teeth gearing with the pinion E and mounted on the sleeve *a'* instead of the follower C. Thus the applications respectively of G or H cause C' to rotate in opposite directions, reversing the direction of motion of the chain-wheel R, as may be required.

The wheels G, H, and R may be of any construction or relation suitable to the circumstances of use.

In order to render the controlling-gear shown in Figs. 7 and 8 capable of being worked by one lever P, it is centered at *p*, so that side motion, as indicated by the arrows in Fig. 7, will operate the clutch G' H' with the desired result. The lever P is also linked at *p* to the brake-strap block M', rotating on the shaft *m*, so that by moving the same lever P in the other directions the brakes M and N can be operated at will. Thus the two slower speeds are obtained by moving the lever P to the right or left in Fig. 8 and full speed by moving it to the left in Fig. 7.

In operation with the construction shown in Figs. 1, 2, 3, 7, and 8, assuming that B is the driving-wheel, C the driven wheel, D the primary pinion meshing with the driving-wheel, E the secondary pinion meshing with the driven wheel, H the supporting-wheel for the pinions, and G the controlling-wheel the teeth of which engage those of the pinion D diametrically opposite the wheel B, the power will be transmitted through the shaft A, wheel B, and pinions D and E to the wheel C, and the speed will be controlled by the clutch and brakes acting on the wheels G and H. If a like speed for driving and driven wheels is desired, the wheels G and H will be clutched together against independent rotation by forcing the coned face of the wheel G into the coned face of the wheel H. Then the teeth of wheel G will prevent rotation of the pinion D around its axis, so that it and the pinion E must revolve with the wheel B around its axis. The teeth of the pinion E, meshing with the wheel C, will force it to revolve at like speed with the wheel B. To obtain a different relative speed, the wheels G and H will be unclutched, whereupon each is movable independently of the wheels B and C. If the wheel G is then held stationary by its brake, the rotation of the wheel B will cause the pinion D to roll around on the teeth of the wheel G, in doing which it will slowly revolve on its own axis and impart a like movement to the pinion E, which will revolve the wheel C at a lower speed than that of the wheel B. The wheel H will be carried around the axis of the wheel B with the pinions. For a still different speed the wheel H may be held stationary by its brake and the wheel G released. In such case the wheel B will revolve the pinions around their axis, causing the wheel G to move in reverse direction and the pinion E to drive the wheel C at a speed proportioned to the relative diameters of the pinions and wheels B and C.

Referring to the modification shown in Figs. 5 and 6, I have shown the two pinions D' and E' both cut out of one piece of metal and rotating freely on the axle F'. The differential wheel H³ is made in two parts H⁴ H², rigidly connected by the axles F" F' and arranged as illustrated. By this modification the whole gear is self-contained and self-protected, holding itself securely together without the aid of any end stop, such as *d*, Fig. 1. I also in this construction employ stiffeningstays, as shown at S S, Fig. 6, between the disks H⁴ H², whereby great strength and rigidity are secured. By duly proportioning the gear-wheels I am able to obtain a variety of speed ratios, which, though generally used for reduction, may obviously be employed for multiplication.

Having now described my invention, what I claim as new, and desire to secure by Letters Patent, is—

1. A variable-speed gearing consisting of driving and driven wheels, in combination with pinions having two independent motions, a rotation upon their axis and a rotation of that axis around that of said wheels, a controlling-wheel having teeth meshing with those of one of said pinions, and movable independently of said wheels, one of said pinions meshing with the driving-wheel and the other of said pinions meshing with the driven wheel, a supporting-wheel carrying said pinions and movable independently of said wheels, and brakes controlling rotation of said controlling and supporting wheels respectively.

2. A variable-speed gearing consisting of the combination of a pinion having two independent motions, a rotation upon its axis and a rotation of that axis around that of a supporting-wheel, such supporting-wheel carrying said pinion, a second wheel and a third wheel independently movable relatively to each other, each with teeth meshing with those of such pinion the one at one side and the other at the diametrically opposite side thereof, so that the said pinion can roll upon and between the teeth of said second and third wheels, a second pinion revolving with said first-mentioned pinion, means controlling movement of said second, third and supporting wheels, and a fourth wheel gearing with said second pinion, substantially as and for the purpose set forth.

3. A variable-speed gear comprising a driving-wheel, in combination with a pair of pinions, rotating together on one axle, a supporting-wheel supporting said axle, a driven wheel, and an independent wheel, each meshing with one pinion of such pair so as to roll upon same, brakes on the supporting and on the independent wheels respectively, and means for operating such brakes, substantially as set forth.

4. A variable-speed gear comprising a driving-wheel, in combination with a pair of pinions, rotating together on one axle, a differential wheel supporting said axle, a driven wheel, and an independent wheel, each meshing with one pinion of such pair so as to roll upon same, a clutch between the differential and independent wheels, and means for operating such clutch, band-brakes on the differential and independent wheels, and means for operating such brakes, substantially as described.

5. A variable-speed gear comprising driving and driven gear-wheels mounted on the same axis, in combination with differential pinions mounted on an axis parallel with that of said wheels, revolving together around their axis and revoluble around the axis of said wheels, and meshing the one with one of said wheels and the other with the other of said wheels, a supporting-wheel supporting said pinions and revoluble around the axis of said driving and driven wheels, and a controlling-wheel meshing with one of said pinions for controlling its movement and movable independently of the supporting-wheel, and means for clutching said supporting and controlling wheels together against independent movement, substantially as and for the purpose set forth.

6. A variable-speed gear comprising driving and driven gear-wheels revolving on the same axis, differential pinions gearing the one with one of said wheels and the other with the other thereof, revolving together on the same axis and revoluble around the axis of said wheels, a supporting-wheel carrying said pinions, a controlling-wheel meshing with one of said pinions, and movable relatively to said supporting-wheel and means for arresting the revolution of one of the latter wheels, substantially as and for the purpose set forth.

In witness whereof I have hereunto set my hand in presence of two witnesses.

ARTHUR G. COOKE.

Witnesses:
JOSEPH C. CHAPMAN,
JOSEPH LAKE.